United States Patent [19]

Orth et al.

[11] Patent Number: 5,267,770
[45] Date of Patent: Dec. 7, 1993

[54] FOLDING TOP FOR MOTOR VEHICLES

[75] Inventors: Stefan Orth, Sindelfingen; Karl Köster, Nagold; Klaus P. Claar, Gechingen; Jürgen Schrader, Weil im Schönbuch; Walter Cornel, Sindelfingen; Helmut Rottler, Aidlingen; Martin Guckel, Wiernsheim, all of Fed. Rep. of Germany

[73] Assignee: Mercedes-Benz AG, Fed. Rep. of Germany

[21] Appl. No.: 933,783

[22] Filed: Aug. 24, 1992

[30] Foreign Application Priority Data

Aug. 24, 1991 [DE] Fed. Rep. of Germany ....... 4128115
Mar. 31, 1992 [EP] European Pat. Off. ......... 92710009.9

[51] Int. Cl.$^5$ ............................................. B60J 7/00
[52] U.S. Cl. .................................................... 296/107; 296/201; 296/146.14
[58] Field of Search ............... 296/107, 108, 116, 117, 296/201 X, 136

[56] References Cited

U.S. PATENT DOCUMENTS

| | | | |
|---|---|---|---|
| 3,994,524 | 11/1976 | Lehmann | 296/107 |
| 4,572,570 | 2/1986 | Trucco | 296/107 |
| 4,573,732 | 3/1986 | Muscat | 296/108 |
| 4,711,485 | 12/1987 | Maebayshi et al. | 296/108 |
| 4,741,571 | 5/1988 | Godette | 296/107 |
| 4,778,215 | 10/1988 | Ramaciottl | 296/107 |

FOREIGN PATENT DOCUMENTS

| | | |
|---|---|---|
| 3416330 | 5/1984 | Fed. Rep. of Germany ...... 296/107 |
| 3726430 | 9/1988 | Fed. Rep. of Germany ...... 296/107 |
| 3907227 | 5/1990 | Fed. Rep. of Germany ...... 296/107 |
| 728718 | 4/1955 | United Kingdom ............... 296/107 |

Primary Examiner—Robert R. Song
Attorney, Agent, or Firm—Evenson, McKeown, Edwards & Lenahan

[57] ABSTRACT

The invention relates to a folding top for motor vehicles with a dimensionally stable rear window which, when the top is opened, can be folded down from an upright, position of use into a flat position of non-use. The top cover encloses the rear window and is connected along the lower edge side of the rear window and laterally thereto to a material retaining section arranged at the lower termination of the top. The rear window exhibits an axis of articulation extending approximately parallel to the lower edge side of the rear window which is displaced rearwards relative to the material retaining section during movement of the rear window toward a position of non-use. The axis of articulation is arranged to be displaceable to ensure the displaceability of the rear window. In order also to permit appropriate rearward displacement of the rear window with top arrangements in which the lower edge side of the rear window extends at a relatively short distance from the material retaining hoop when the top is closed, the top cover is provided on both sides of the rear window with a fabric zone of variable length, the fabric zones being capable of being drawn apart by the rearward displacement of the rear window when the folding top is laid flat and being capable of shortening to their initial length when the folding top is erected into the closed position of use.

16 Claims, 7 Drawing Sheets

FOLDING TOP FOR MOTOR VEHICLES

BACKGROUND AND SUMMARY OF THE INVENTION

The invention relates to a folding convertible top for motor vehicles of the type having a dimensionally stable rear window. Such a folding top has already been disclosed in German published unexamined patent application no. (DE-OS) 34 16 330, the rear window being a large-sized pane of glass. When the folding top is closed, the lower edge side of the rear window is at a substantial distance from the top cover retaining section of the bodywork, as a result of which a relatively broad strip of the fabric of the top cover is tensioned between the rear window and the retaining section. For the purposes of transversely displaceable articulation, the rear window is mounted on the bodywork by means of a guide device which has a cross section resembling a toggle lever.

When the rear window is laid flat, the upper lever arm of the guide device thus swings downward along a circular path about the axis of the intermediate joint until it rests on the lower lever arm of the guide device. As a result, the rear window, which is articulated on the upper lever arm, is displaced rearwards relative to the material retaining section of the body-work and at the same time is moved closer to the material retaining section, as a result of which the fabric strip between the rear window and the material retaining section is released from tension and laid down in folds.

Since the top cover is also released from tension to the side of the rear window as a consequence of the movement of the rear window towards the material retaining section, all that happens as a result of the procedure of displacing the rear window is a slight tightening of the fabric zones of the top cover lying laterally adjacent to the rear window.

In order to have a better view over the tail of the vehicle when the folding top is closed, it would be desirable per se to allow the lower edge side of the rear window to extend as close as possible to the material retaining section. As a result of this, however, the axis of articulation of the rear window, with the top closed, would extend at a correspondingly short distance above the material retaining section, as a result of which it would no longer be possible to achieve any significant lowering of the lower edge of the window relative to the material retaining section during opening of the top. As a consequence, the lowering of the rear window would not result in such an extensive release of tension in the fabric zones lying laterally adjacent to the rear window for a sufficient rearward displacement of the rear window to be possible, with tightening of these fabric zones in the longitudinal direction of the vehicle.

An object of the invention is to develop a folding top of the generic type described in such a manner that the lower edge side of the rear window can extend at a relatively short distance from the material retaining section when the folding top is closed and a substantial rearward displacement travel of the rear window still remains possible.

This object is achieved, according to preferred embodiment of the invention by providing an arrangement.

In certain preferred embodiment, wherein the top cover is provided with a fabric zone of variable length on each side of the rear window, the fabric zones being capable of being drawn apart by the rearward displacement of the rear window when the folding top is laid flat, and being capable of being shortened to their initial length when the folding top is erected into its closed position of use any rotary sliding articulation of a known type is, per se, suitable here as a transversely displaceable swivel fastening. In principle, it is conceivable here for the fabric zones to be of a design such as to be elastically extensible lengthwise, since fabrics of elastic rubber filaments are known per se.

In order to be able to guarantee a uniform appearance of the top cover, the fabric zones which are variable lengthwise preferably consist of sewn-in folds of the top cover fabric.

For reasons of production engineering, it is advantageous according to certain preferred embodiments to provide that the fabric folds each extend from a connecting seam between two fabric webs of the top cover.

A completely inconspicuous arrangement of the fabric folds when the top is closed ca be achieved in that the crease of the fabric folds runs, in each case, in the extension of an associated turnover crease.

A particularly simple and space-saving articulation of the rear window on the material retaining hoop is provided by using a strip of the fabric of the top cover itself which acts as a film hinge.

In the case of a folding top with a large-sized rear window which can be retracted into a top box, the rear window can be displaced in a space-saving manner almost to the rear wedge end of the material retaining hoop, as a result of which the top box itself and the top box aperture can be of especially narrow design.

A correspondingly large rearward displaceability of the rear window can additionally be achieved, in a simple manner in that the fabric strip of the top cover enclosing the circumference of the material retaining top remains unattached.

During the rearward displacement of the rear window, there occurs a sliding motion of the rear frame part of a window frame enclosing the rear window on the middle section of the material retaining hoop lying below it. In order to be able to prevent damage caused by scratching of the metal surfaces sliding upon each other and, in particular, the generation of friction noise, an arrangement of sliding means is provided in certain preferred embodiments for the sliding support of the frame part on the outer surface of the material retaining hoop.

The arrangement of sliding means preferably comprises a plurality of individual slides which, relative to the median longitudinal axis of the convertible car, are arranged in mirror symmetry on the underside of the frame part. As a result, the sliding motion can deliberately be restricted to particular sliding points.

Advantageously, the slides each consist of a mounting rail which can be removably attached to the frame part and supports a padding element, the element interacting with the material retaining hoop in a sliding relationship.

For production engineering reasons, it is advantageous to use as the padding element an extruded section of an elastic material, such as rubber or the like, which can be connected to the mounting rail by simply being pushed thereon.

In order to attach the mounting rail to a window frame which in any case has a plurality of screw connection points on the lower frame part, without any additional fixing means being needed, two screw connection points on the frame part can in each case serve simultaneously as screw fixing points for the mounting rail.

The fabric folds of the top cover can, in principle, be held in their tightened overlapping position solely by means of tensile forces in the fabric of the top cover, provided that the top is closed. However, this presupposes that the longitudinal tensile forces in the top cover, the direction of traction of which extends approximately parallel to the lateral edges of the rear window, would be much greater than the transverse tensile forces oriented in the circumferential direction of the tail region, which tend to pull the fabric folds apart.

In order reliably to prevent the gaping open of the fabric folds despite substantially uniform tensile forces in the top cover in certain preferred embodiments, each fabric fold is assigned a leaf spring element which supports the fabric folds against transverse tensile forces in the top cover, and is fixed by one end to the window frame of the rear window and by its other end to the material retaining hoop. In this arrangement, the upper end of the leaf spring element is expediently fixed by screwing to the window frame, the screw fixing point being able to be identical with an existing screw connection point on the window frame in order to avoid an additional screw fixing means.

A substantial saving of fixing means in combination with a particularly simple way of mounting the leaf spring elements is achieved if a lower end region of the leaf spring elements is bent in the form of a hook and engages securingly around the rear profile cross section of the material retaining hoop.

Other objects, advantages and novel features of the present invention will become apparent from the following detailed description of the invention when considered in conjunction with the accompanying drawings.

DETAILED DESCRIPTION OF THE DRAWINGS

Figure 1:
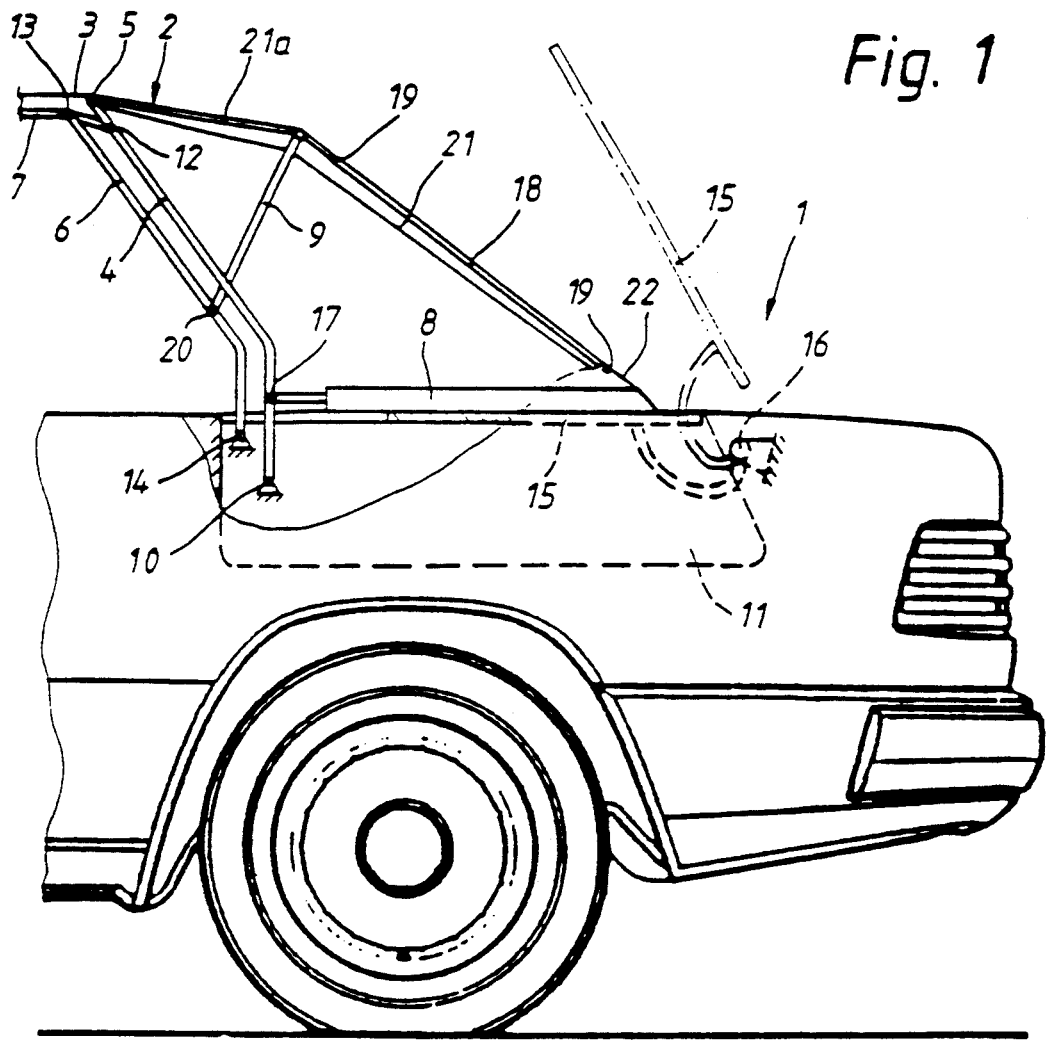
FIG. 1 is a schematic lateral view of a rear region of a convertible car with its folding top closed, constructed according to a preferred embodiment of the invention.

In the lateral view according to FIG. 1, a tail or rear end region of a convertible car 1 with a retractable folding top 2 can be seen, comprising in a conventional manner a supporting top frame over which is stretched a flexible top cover 3 of textile fabric of a known type.

In the rear region of the top frame which is mirror-symmetrical relative to the longitudinal median plane of the convertible car 1, there can be seen a top support pillar 4 of a main strut 5, a main connecting rod 6, a lateral roof frame 7, a material retaining hoop 8 and a corner strut 9. The lower end of the pillar 4 is fastened to the body-work of the convertible car 1 in a recessed manner via a main bearing 10 in the lateral leg of a generally U-shaped top stowage or storage box 11, as a result of which the main strut 5 can be pivoted about a horizontal transverse axis of the vehicle. In the upper end region of the pillar 4, a rear end of the roof frame 7 is connected to the pillar 4 via a hinge joint 12. The roof frame 7 is retained in its design position by the associated main connecting rod 6 whose upper end is articulated via a hinge joint 13 on the roof frame 7, which hinge joint is located at a distance in front of, and thus above, the hinge joint 12. The lower end of the main connecting rod 6, which extends approximately parallel to the pillar 4, is connected to the bodywork via a hinge bearing 14 in the box 11, with a similar vertical offset. Thus the roof frame 7 is guided by the pillar 4 and the main connecting rod 6 in the manner of a parallelogram linkage.

The upward-facing aperture of the top box 11 is closed by means of a matchingly shaped top box lid 15, which rests on the edge of the aperture of the top box 11 and is locked thereto in a manner not shown. On the top box lid 15 lies the likewise U-shaped material retaining hoop 8, which forms the lower termination of the top 2 and retains the top cover 3 at the rear. While the top box lid 15 is mounted behind the top box 11 to be pivotable about an axle 16 fixed to the body-work, the front ends of the lateral sections of the material retaining hoop 8 are cantilever-mounted via a hinge joint 17 on the assigned top support pillar 4, approximately at the height of the upper edge of the vehicle side. At the rear, the material retaining hoop 8 is bolted to the top box lid 15 by means of a closure arrangement (not shown) and is thus held down in its illustrated bearing position.

Above the material retaining hoop 8 is a large-sized rear window 18, inset into a rear window aperture in the top cover 3 and retained in a window frame 19 which is peripherally connected to the cover 3 enclosing it. Situated above the rear window 18 is the corner contour of the top 2, where the central tube of the corner strut 9 bears supportingly on the underside of the cover 3. The lateral legs of the generally U-shaped corner strut 9 extend approximately at right angles to the oblique plane of the rear window, forwards and downwards, and are articulated by their ends on the associated main connecting rod 6 a hinge joint 20. As a result, the corner strut 9 is pivotably mounted relative to the top cover 3 and to the main connecting rods 6. In its supporting position as shown, the corner strut 9 is retained by two straps 21 of low lengthwise extensibility, each of which is connected to a flank of the corner strut 9, extends under the top cover 3 in the longitudinal direction of the vehicle, and is stretched forwards to the main strut 5 and rearwards to the material retaining hoop 8, where its respective ends are fixed. Furthermore, the window frame 19 is connected, above the rear window 18, to the central tube of the main strut 5 via a plurality of straps 21a of similar extensibility properties. The straps 21a, which are likewise tautly stretched, rest on the central tube of the corner strut 9, without fixing, and prevent the gravitational force of the rear window 18 from having to be absorbed exclusively by the top cover 3.

Figure 3:
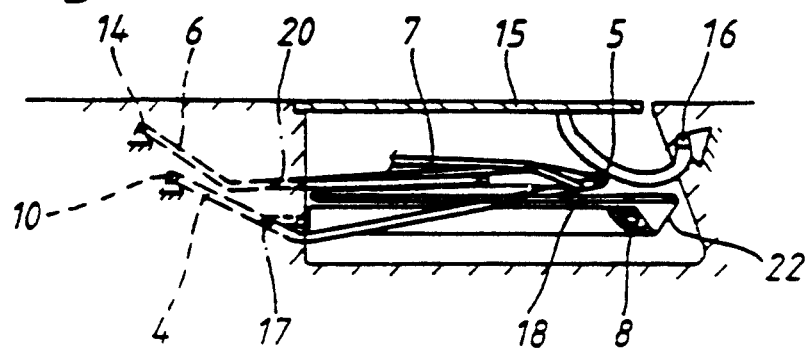
FIG. 3 is a longitudinal sectional schematic view through the top storage box taken along section-line III—III in FIG. 2.

In order to open the folding top 2 it is first necessary to release front top catches which connect the front roof part (not shown) to the windscreen frame. Then the locking of the material retaining hoop on the top box lid 15 is released and the material retaining hoop 8 is swung forwards about the hinge joint 17 of the top support pillar 4, which is still upright, after which the top box lid 15, mounted for pivoting in the opposite direction, is released, and, after its unlocking, can be swung upwards and rearwards into the open position indicated by continuous lines. The folding top 2 can be swung around the main bearing 10 into the open top box 11 until it reaches its flat position of non-use, which is shown in FIG. 3. When this occurs the rear window 18 is folded down and laid flat between the central tube of the main strut 5 and the material retaining hoop 8, after which it rests on the top of the material retaining hoop 8.

Figure 2:
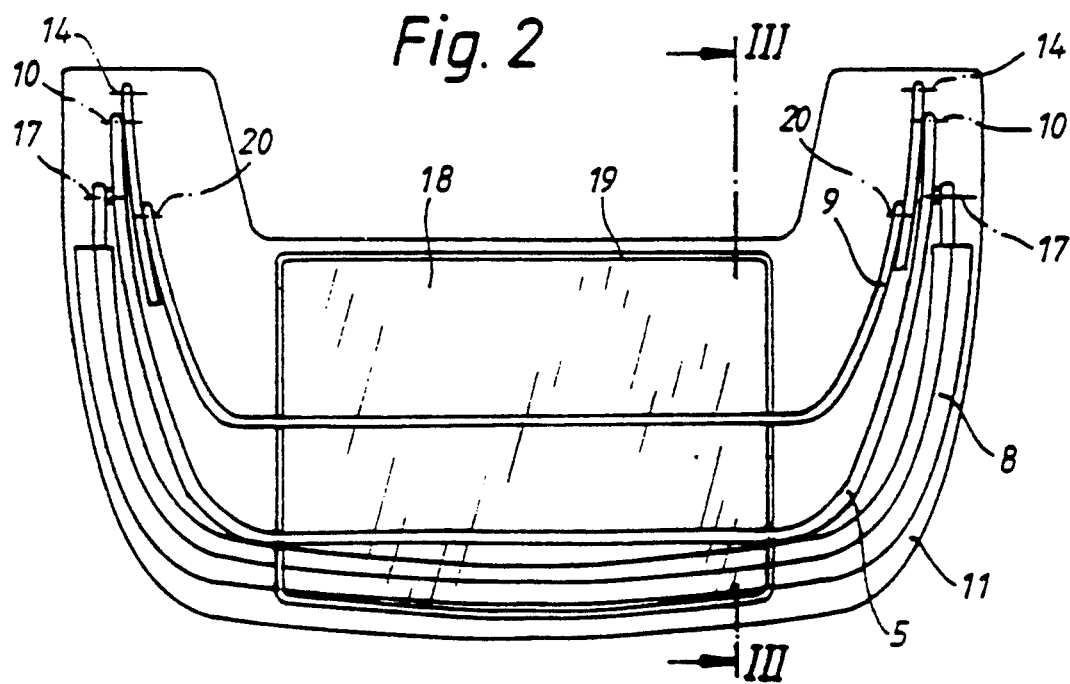
FIG. 2 is a plan view of the top storage box of the convertible car of FIG. 1 with the folding top laid flat.

As can be recognized in connection with the simplified plan view according to FIG. 2, the clear cross section of the top box 11, in the central region which receives the rear window 18, is only slightly longer than the rear window 18 itself. This creates the requirement that the rear window 18, in the course of the process of lowering the top 2, should not only be folded down along a pivot axis extending below the lower window edge but also be displaced rearwards to the rear edge of the material retaining hoop 8, the pivot axis likewise having to be displaced transversely to its longitudinal extent. In this arrangement, the transversely displaceable axis of articulation is formed by a narrow fabric strip 22 of the hood cover 3 itself, which acts as a film hinge. Along a lengthwise side, the fabric strip 22 is connected, for this purpose, to the lower edge side of the rear window 18 via the window frame 19. With its opposite edge side, the fabric strip 22 is fixed along the underside of the material retaining hoop 8, and encloses, without fixing, the shaping circumference of the material retaining hoop 8. The shaping circumference here is considered to be the oblique circumferential surface of the profile of the material retaining hoop, which is wedge-shaped in cross section, this surface extending approximately parallel to the inclination of the rear window 18 when the top 2 is closed. During the rearward displacement of the rear window 18 relative to the material retaining hoop 8, the length of the fabric strip 22 which previously rested on the circumference of the hoop is lifted free and guides the lower edge side of the rear window 18 rearwards, approximately parallel to the upper side of the material retaining hoop 8. It is thus possible to dispense with additional guide devices for the lower edge side of the rear window 18.

When the top 2 is closed, the lower corners of the rear window 18 lie very close to the upper side of the material retaining hoop 8, so that no major downward movement of the lower edge side of the rear window 18 towards the material retaining hoop 8 can take place. Instead, the free width of material of the fabric strip 22 is just sufficient to form a reliable film hinge when the rear window 18 is folded down.

In order to ensure that no partial over-extension of the top cover 3 can occur when the rear window 18 is displaced rearwards into its flat position of non-use, the top cover is provided with a fabric zone of variable length on each side of the rear window 18, which, when the top cover 3 is laid flat, move apart as a result of the rearward displacement of the rear window 18 relative to the material retaining hoop 8, and automatically shorten again to their initial length when the top 2 is erected into the closed position of use. These two fabric zones are designed as fabric folds 23 of mirror symmetry which, when the top 2 is closed, are held in a tightened overlapping position by means of tensile forces in the top cover 3.

Figure 4:
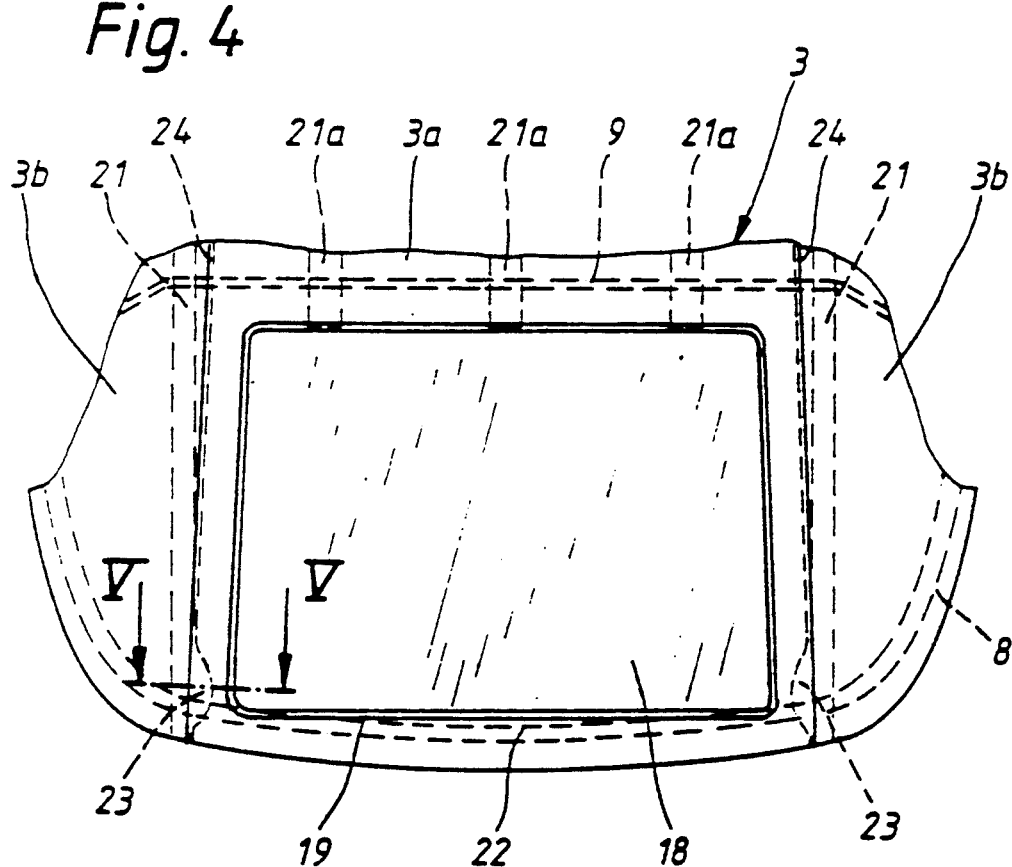
FIG. 4 is a perspective view of the closed folding top of FIG. 1 from behind, depicting a folding arrangement of the top cover.
Figure 5:
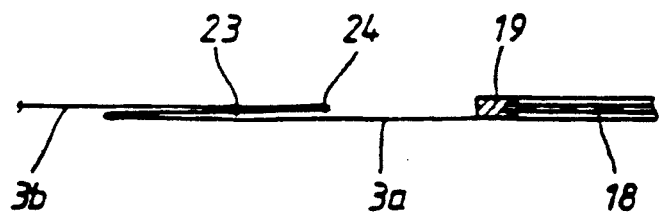
FIG. 5 is a schematic sectional view through a fabric fold of the folding arrangement taken along section line V-V in FIG. 4.

As is apparent in FIG. 4, the fabric folds 23 are each located at a lateral distance from the lower corners of the rear window 18, and extend, viewed in the vertical direction, over the width of the fabric strip 22 and a fabric region of the cover 3 adjacent thereto, close to the assigned side edge of the rear window 18. Viewed in the longitudinal direction, that is to say the direction of circumferential stress of the top cover 3, the fabric fold 23 has its greatest fold width approximately at the height of the assigned window corner, the fold width gradually decreasing both upwards and downwards. The top cover 3 is composed of a central web 3a, which is somewhat broader than the rear window 18 integrated therein, and two lateral webs 3b of mirror symmetry. A connecting seam 24, which is designed as a lap seam and in each case extends in the longitudinal direction of the top, serves to connect the central web 3a to the two lateral webs 3b. In accordance with this seam design, a region of the edge surface of the central web 3a is turned over for a width of a few mm and stitched to the assigned edge strip of the lateral web 3b, the turnover being formed into a sharp crease. The crease of the turnover here makes a direct transition into a sharp crease of the fabric fold 23. For this purpose, the fabric folds 23 each start from the assigned connecting seam 24, as can be seen in connection with the sectional illustration according to FIG. 5. Viewed over the vertical or perpendicular extent of the fabric folds 23, the otherwise straight connecting seam 24 extends with an arcuate curvature, as a result of which the connecting seam 24 springs back relative to the line of the seam. The curved longitudinal sections of the connecting seam 24 here depart from the straight line of the seam and extend toward the lateral edges of the rear window 18. However, it would likewise be conceivable to provide the turnover on the lateral web 3b and to allow the curved longitudinal section of the connecting seam 24 to extend in the opposite direction. It goes without saying that the blank of the fabric webs 3a and 3b must be so adapted that the intended course of the seam to generate the fabric folds 23 becomes possible.

Figure 6:
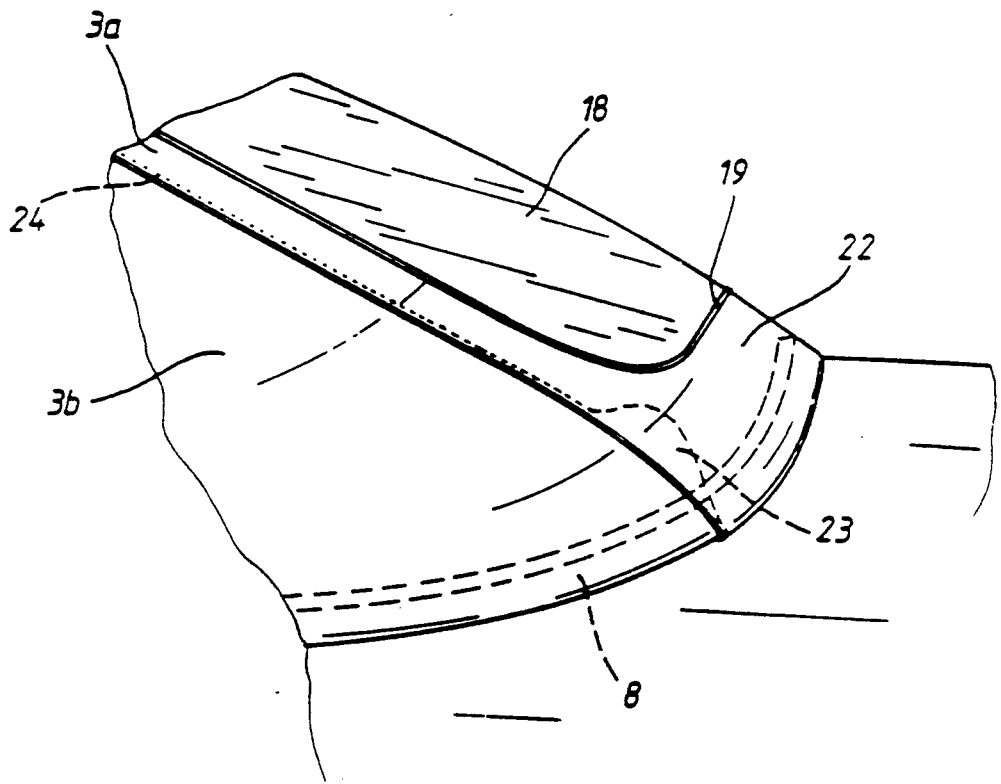
FIG. 6 is an oblique rear perspective view of the fabric folds of the folding top of FIG. 1 shown in a top closed position.

As can seen in the perspective lateral view according to FIG. 6, the fabric folds 23 are hardly visible when the top 2 is closed. Instead, all that is visible is a continuous straight crease which lies in a raised manner on the tightly stretched lateral web 3b and gives the visual impression of a continuous straight turnover of a conventional lap seam. The tensile forces in the top cover 3 acting in the longitudinal direction of the connecting seam 24 secure these inconspicuously supported fabric folds 23 in their folded position.

Figure 7:
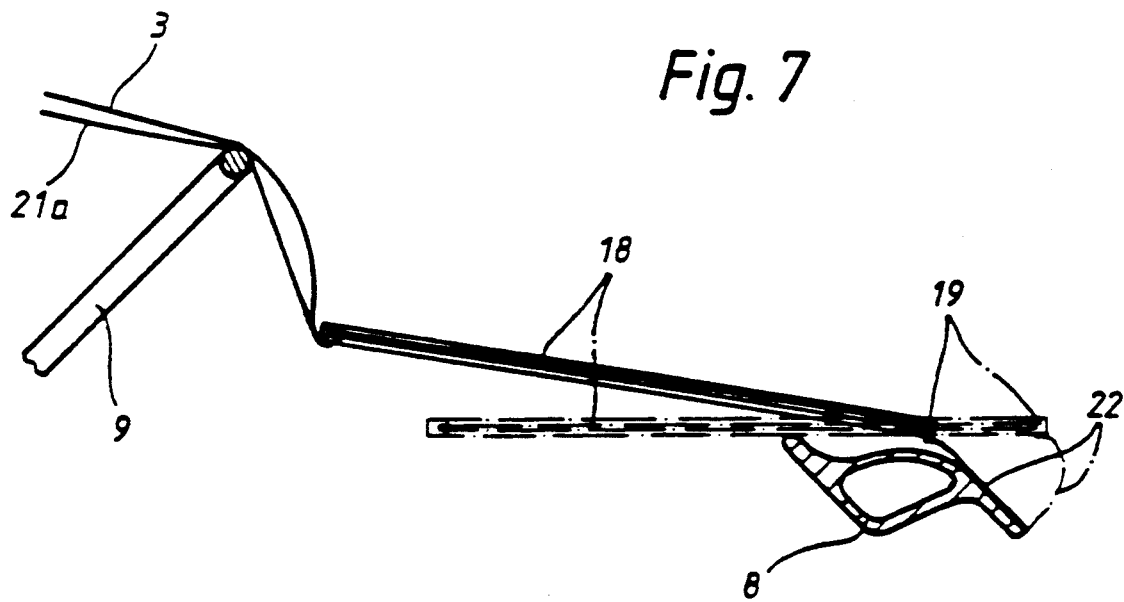
FIG. 7 is a longitudinal sectional view showing a partly folded-down rear window of the folding top of FIGS. 1-6.

In FIG. 7 it is apparent that the tensile forces in the top cover 3 are no longer effective when the top 2 is partially lowered. Since the material retaining hoop 8 is swung about the hinge joint 17 relative to top support pillar 4 and towards the latter, the rear window 18 descends under the effect of its own weight and folds downwards about its film hinge, formed by the fabric strip 22. Since the rear window 18 is retained by the straps 21a at its upper edge side, it nevertheless retains its obliquely rearward-directed orientation until it has reached its contact position on the material retaining hoop 8. As a result, during the process of lowering in the top storage box 11, a force component resulting from the dead weight of the rear window 18 acts upon the rear window 18, and assists the rearward displacement of the rear window 18 relative to the material retaining hoop 8. Thus, by manual intervention, the rear window 18 can effortlessly be displaced into its rear end position in the hood box 11.

Figure 8:
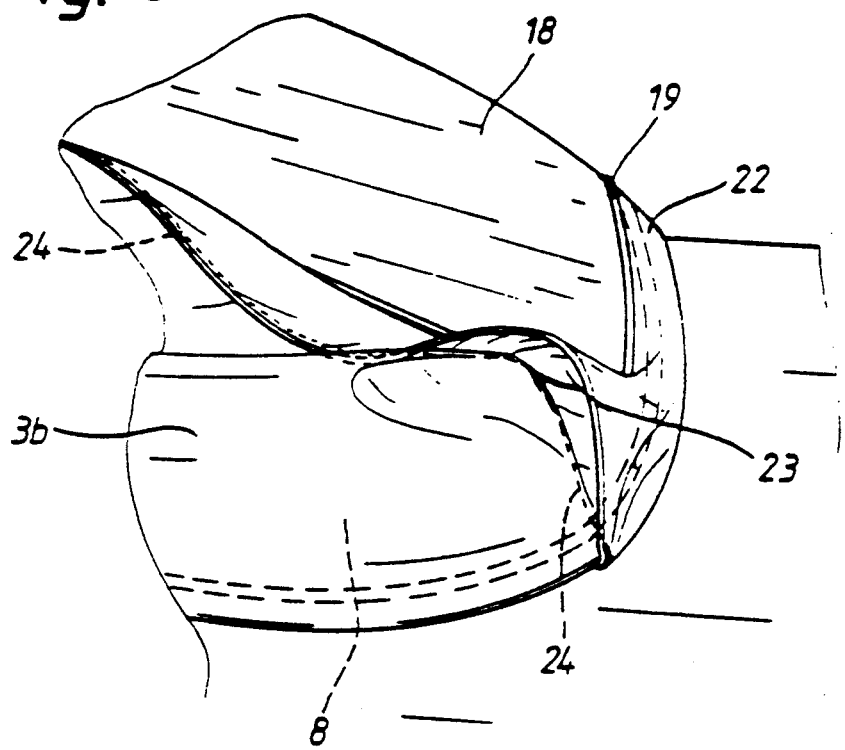
FIG. 8 is an oblique perspective view of the fabric folds of the folding top of FIGS. 1-5, shown in a position with the rear window partly folded down.
Figure 9:
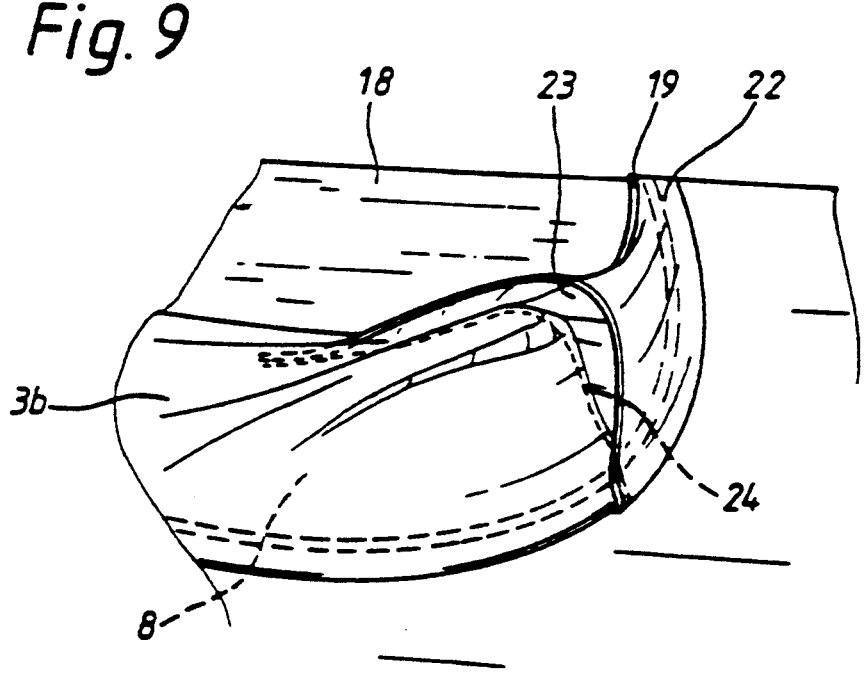
FIG. 9 is an oblique rear perspective view of the fabric folds of the folding top of FIGS. 1-5 shown in a position with the cover laid flat.

In the course of this the fabric folds 23, as is apparent in FIGS. 8 and 9, are increasingly drawn apart, unfolding in the manner shown. In the position of non-use according to FIG. 9, the seam line of the connecting seam 24 as seen from above eventually extends stretched approximately straight, since the fabric fold 23 is completely drawn apart.

If the folding top 2 is closed again, the fabric folds 23 automatically contract into their starting position, according to FIG. 6, as a result of the tensile forces in the top cover 3.

Figure 10:
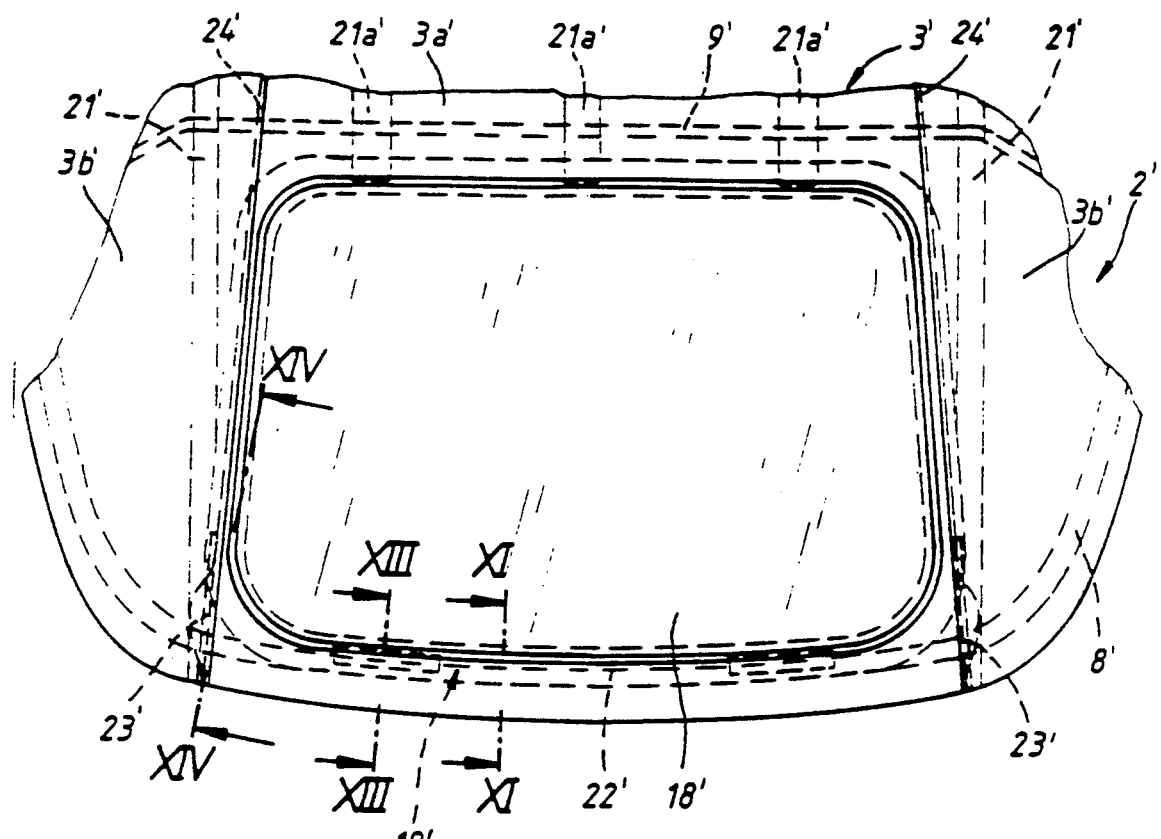
FIG. 10 is a view similar to FIG. 4 which shows an alternative embodiment of the folding top in a view of the closed top from the rear with a folding arrangement in the top cover.

FIG. 10 shows an alternative embodiment of the folding top 2, which is modified in some important details while the functional principle is retained, and in particular exhibits a different arrangement of the rear window.

In order to avoid repetitions, the description of the folding top 2' which follows will explain only the differences from the previously described top 2, components which serve the same function being provided with the same reference numerals and being identified merely by a prime symbol.

The rear window 18' is more sharply curved in the direction of its width, its lower end surface having an arcuate curvature for adaptation to the curvature of the material retaining hoop 8'. It widens in the manner of a trapezium from top to bottom, and its corners are rounded with much greater radii. The material blank of the top cover 3' is modified so that the connecting seams 24' extend at a reduced lateral distance from the rear window 18' but parallel to the straight longitudinal regions of its lateral end surfaces. The arrangement of the two fabric folds 23' is reversed, that is to say that the curved longitudinal sections of the connecting seams 24' extend away from the lateral edges of the rear window 18' relative to the straight line of the seam. Thus the two fabric folds 23' each lie below the lateral web 3b' assigned to them.

Figure 12:
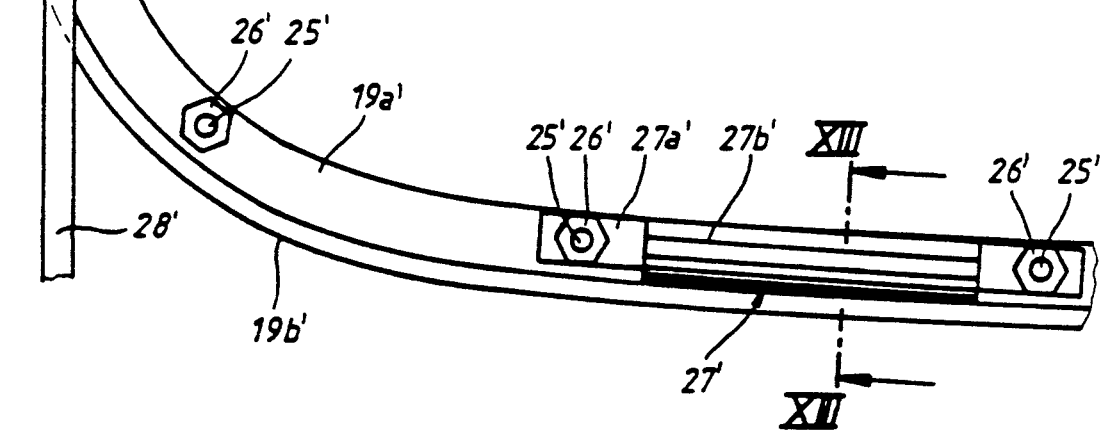
FIG. 12 shows the arrangement of a slide on the rear frame part of the window frame according to FIG. 10 in a separate partial view.

As can be seen in connection with the sectional illustration in FIG. 12, the window frame 19' comprises an interior retaining frame 19a', into which the rear window 18' is adhesively fixed, and a similarly peripheral supporting frame 19b' which overlaps the retaining frame 19a' adjacent to a parting line between the end edges of the rear window 18' and the top cover 3'. A material strip of the top cover 3', which adjoins the window aperture and is folded around the supporting frame 19b', is forced between the surfaces of the retaining frame 19a' and the supporting frame 19b', which are in mutual contact, and is thus held by frictional fitting. In order to clamp the material strip and to connect the retaining frame 19a' releasably to the supporting frame 19b', a plurality of screw connections are distributed over the extent of the window frame 19'. A corresponding number of stud bolts 25' are fixed on the supporting frame 19b' and pass through assigned perforations in the retaining frame 19a'. A threaded nut 26' is screwed onto the thread of each of the stud bolts 25' and is tightened with a structurally defined torque in order to produce the desired clamping effect.

As is indicated in the drawing, a circumferential seal can also be arranged in the clamping seat.

In order to prevent the window frame 19' from causing sliding noises during the rearward displacement of the rear window 18', as a result of friction of its lower or rear frame part on the outer surface of the material retaining hoop 8', and in order to prevent damage caused by scratching of the material retaining hoop 8' by the projecting stud bolts 25', two slides 27' are arranged on the lower frame part of the window frame 19' and guarantee a suitably spaced support of the window frame 19' on the outer surface of the material retaining hoop 8'. These two slides 27' are offset laterally relative to the center of the rear window 18' and are arranged with mirror symmetry relative to each other on the underside of the rear frame part.

Figure 13:
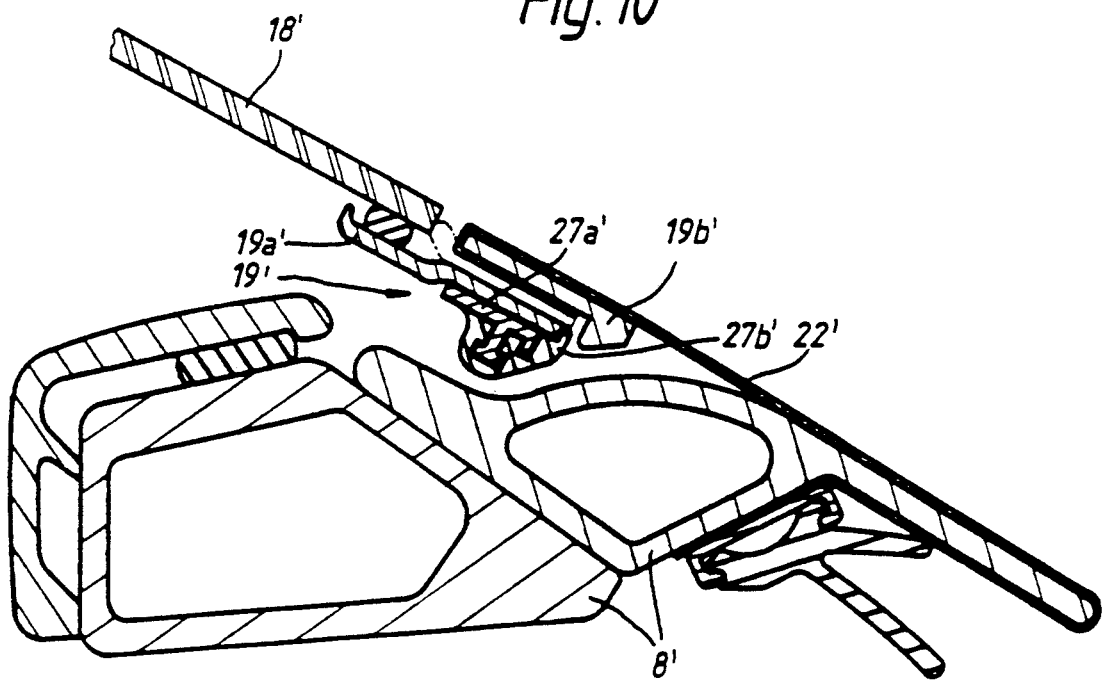
FIG. 13 is a cross sectional view through the slide taken along section line XIII—XIII in FIG. 10.
Figure 11:
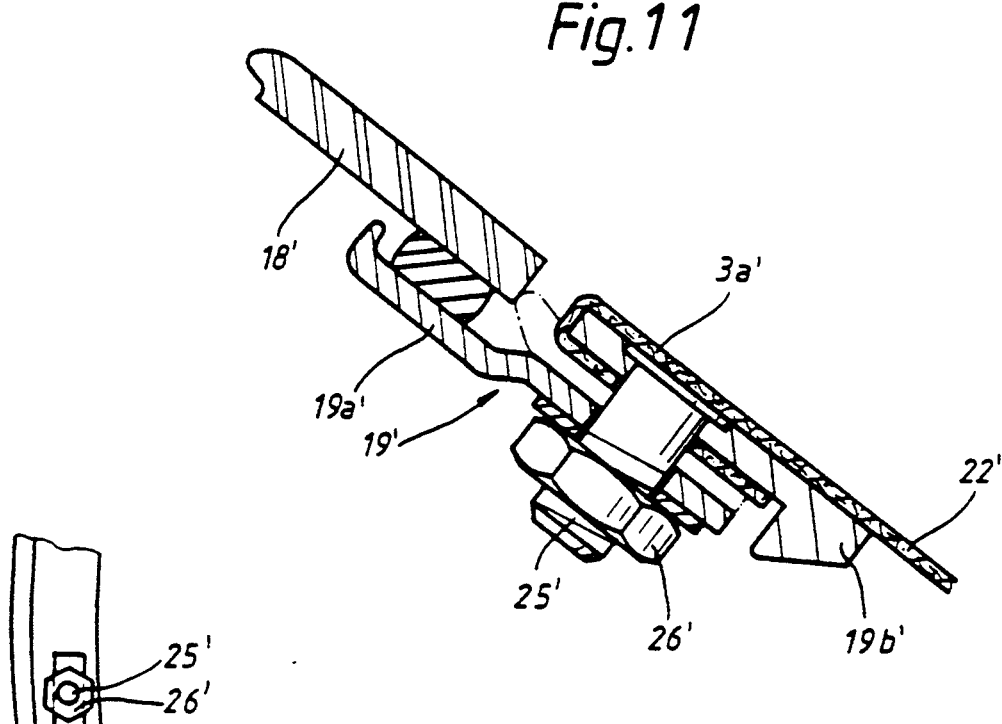
FIG. 11 shows a section through a screw connection point of a multi-part window frame of the rear window of the folding top, taken along section line XI—XI in FIG. 10.

As can be clearly seen in the partial view from the inside, according to FIG. 12, in connection with the sectional illustration in FIG. 13, the slide 27' comprises a rigid metal mounting rail 27a' which is somewhat longer than the distance between two adjacent stud bolts 25', which project from the retaining frame 19a'. The mounting rail 27' is pierced by two holes at the distance apart of the adjacent stud bolts 25', through which the stud bolts 25' also penetrate. Since the assigned threaded nuts 26' are tightened with the interposition of the end regions of the mounting rail 27', the mounting rail 27' is fixed to and in full surface contact with the inside of the retaining frame 19a', use being made of screw connection points which are in any case present on the multi-part window frame 19'.

A raised flexible padding element projects from the opposite broad side of the mounting rail 27', and in this case consists of rubber and is somewhat shorter than the distance between the screw fixing points of the mounting rail 27a'. This padding element consists of an extruded section 27b and thus has a constant cross section. In order to connect the extruded section 27b' to the mounting rail 27a', a retaining web projects from the broad side of the mounting rail 27a', which retaining web has, for example, a T-shaped anchoring cross section, and it being possible for an extruded section 27b' having a matching clear cross section, to be pushed on to this retaining web before the screw fixing of the mounting rail 27a'. In addition, the compressibility of the extruded section 27b' is limited by the retaining web, so that contact by the ends of the stud bolts as a result of excessive compression of the extruded section 27b' can be ruled out.

When the folding top 2' is closed, the top cover 3' is under substantially uniform stress, as a result of which the transverse tensile forces oriented in the circumferential direction of the tail region act on the fabric folds 23'.

In order nevertheless to prevent gaping of the fabric folds 23' in a reliable manner when the top 2' is closed, a leaf spring element 28', about 10 mm wide, is arranged in the turnover of each of the fabric folds 23' and, with its long side facing the rear window 18', bears supportingly on the inside of the crease of the assigned fabric fold 23' while the hood 2' remains closed.

Figure 14:
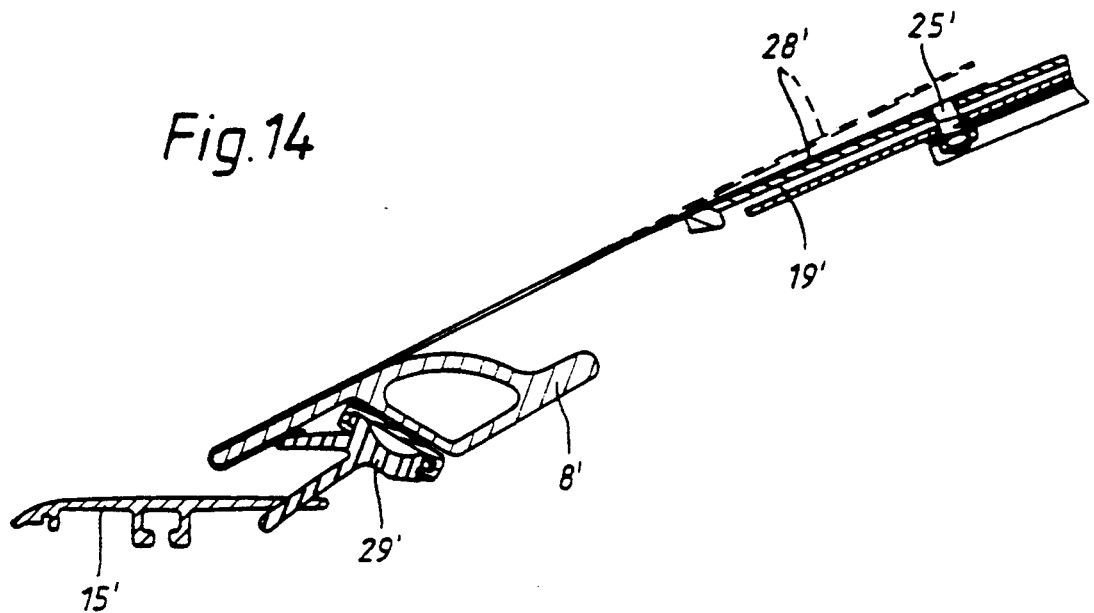
FIG. 14 is a longitudinal sectional view through the arrangement of a leaf spring element of FIG. 12 with the top closed.

As is clearly apparent in connection with the sectional illustration according to FIG. 14, in which the top cover 3' has been omitted, the leaf spring element 28' has only a slight thickness and is slightly bent over its length. The leaf spring element 28' is retained in the upper end region on the lateral part of the window frame 19' by means of a screw fixing, and in the lower end region by means of a hooked connection to the material retaining hoop 8'. For this purpose, the lower end region of the leaf spring element 28' is lengthened accordingly and is bent over into a hook-shaped spring clip with an approximately U-shaped cross section which engages, with a substantially positive fit, around the rear parallel profile cross section of the material retaining hoop 8'. In order for the leaf spring element 28' to rest on the material retaining hoop 8' without being raised, it can be recessed in a flush-fitting manner in a depression in the latter. The upper screw fixing point of the leaf spring element 28' is a screw connection point of the window frame 19' which is provided in any case, so that no additional fixing means are needed to attach the leaf spring element 28'. A profile seal 29' extending below the material retaining hoop 8', which seal bears on the hood box lid 15' when the top 2' is closed, may however have an additional leg which bears with prestress on the rearward leg of the spring clip and secures the hook-shaped end region of the leaf spring element 28' against being pushed downward by the material retaining hoop 8.

Figure 15:
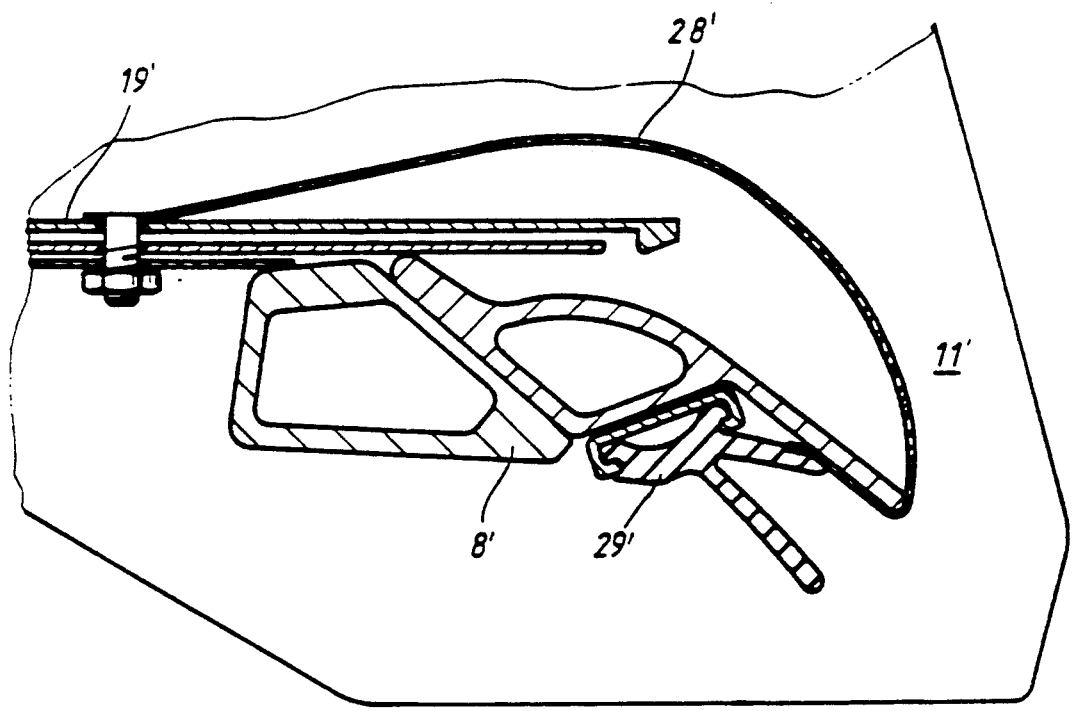
FIG. 15 shows the longitudinal section according to FIG. 14 with the top laid flat.

As is apparent in FIG. 15, the leaf spring element 28' bends substantially over its length when the top 2' is laid flat in the cover box 11', as soon as the rear window 18' is folded down onto the material retaining hoop 8. As a consequence of this bending, the leg of the hook-shaped end region of the leaf spring element 28', previously bearing on the outside of the material retaining hoop 8, is spread open and lifts clear of the material retaining hoop 8'. As a result of the support of its other leg on the back of the material retaining hoop 8', the engagement is nevertheless not lost at this time but is retained even during the rearward displacement of the rear window 18'. Because of the bent leaf spring elements 28', the material of the top cover 3' (not shown here) in the region in which the fabric folds 23' are arranged is simultaneously held at a distance from the lower part of the window frame 19'.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Folding top for motor vehicles having a dimensionally stable rear window, which top can be folded down from an upright position of use with the top closed into a flat position of non-use with the top opened, said top comprising:

a top cover which encloses the rear window and is connected to a material retaining hoop arranged at the lower termination of the top along the lower edge side of the rear window and laterally thereto, said rear window assuming a position of non-use displaced rearwards relative to the material retaining hoop, the axis of articulation of the rear window extending approximately parallel to the lower edge side of the rear window and being transversely displaceable to ensure the displaceability thereof, wherein the top cover is provided with a fabric zone of variable length on each side of the rear window, the fabric zones being capable of being drawn apart by the rearward displacement of the rear window when the folding top is laid flat, and being capable of being shortened to their initial length when the folding top is erected into its closed position of use.

2. Folding top according to claim 1, wherein each of the fabric zones of variable length is formed by a fabric fold of the top cover these fabric folds being retained in a tightened overlapping position on the top cover by means of tensile forces when the folding top is closed.

3. Folding top according to claim 2, wherein the respective fabric folds start from a respective connecting seam between a central web and a lateral web of the top cover, which lateral web projects rearwards relative to an otherwise substantially straight line of the seam in the region of the fabric fold.

4. Folding top according to claim 3, wherein the crease of the respective fabric fold merges into a crease of a turnover, for the formation of which a lateral edge region of one of the stitched-together material webs is folded over.

5. Folding hood according to claim 1, wherein the transversely displaceable axis of articulation is formed by a fabric strip of the top cover itself, which acts as a film hinge.

6. Folding hood according to claim 1, wherein the folding hood can be retracted into an assigned top storage box, the material retaining hoop being a pivotable frame member of the top frame.

7. Folding hood according to claim 6, wherein the top cover is fixed from the underside of the material retaining hoop and encloses, without fixing, a shaping circumference of the material retaining hoop.

8. Folding top according to claim 1, wherein the rear window is enclosed by a window frame whose rear frame part slides on the material retaining hoop during the rearward displacement of the rear window, an arrangement of sliding support structure being provided for the sliding support of the frame part on the outer surface of the material retaining hoop.

9. Folding hood according to claim 8, wherein the arrangement of sliding support structure comprises a plurality of slides which are attached to the underside of the frame part, laterally offset relative to the center of the rear window.

10. Folding hood according to claim 9, wherein each slide comprises a rigid mounting rail which can detachably connected to the frame part of the window frame and which supports an elastically resilient padding element which interacts slidingly with the material retaining hoop.

11. Folding top according to claim 10, wherein a soft elastomeric extruded section is provided as a padding element and can be attached to the mounting rail by being pushed onto a retaining web of the latter.

12. Folding top according to claim 10, wherein the window frame of the rear window is of multi-part design, a plurality of screw connection points for the corresponding frame parts being arranged along the rear frame part, and wherein the screw connection points of the multi-part window frame are additionally used as screw fixing points for the mounting rail of the slides.

13. Folding top according to claim 12, wherein a leaf spring element is provided to support the transverse tensile forces in the top cover at the fabric fold; said leaf spring element being retained at one end by the window frame of the rear window and at the other end by the material retaining hoop, and which, when the folding top is closed, is fixed in a stressed extended position in which it bears supportingly, with one long side, on the crease of the fabric fold.

14. Folding top according to claim 13, wherein a lower end region of the leaf spring element is bent in the form of a hook and engages around the rear profile cross section of the material retaining hoop in the manner of a spring clip.

15. Folding hood according to claim 13, wherein the upper end of the leaf spring element is fixed to the window frame by screwing.

16. Folding hood according to claim 15, wherein the window frame of the rear window is of multi-part design, a plurality of screw connection points for the corresponding frame parts being arranged over the periphery of the window frame, and wherein the upper screw fixing point of the leaf spring element is a screw connection point for the window frame.

* * * * *